United States Patent
Siegel et al.

(10) Patent No.: US 7,256,731 B2
(45) Date of Patent: Aug. 14, 2007

(54) POWER CYCLING FOR A GLOBAL POSITIONING SYSTEM

(75) Inventors: Neil G. Siegel, Rancho Palos Verdes, CA (US); David Bixler, Hermosa Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 341 days.

(21) Appl. No.: 10/855,205

(22) Filed: May 27, 2004

(65) Prior Publication Data

US 2005/0275587 A1    Dec. 15, 2005

(51) Int. Cl.
*G01S 5/02* (2006.01)
(52) U.S. Cl. .............................. 342/357.06; 342/357.13
(58) Field of Classification Search ........... 342/357.06, 342/357.13, 374; 701/207, 213; 455/277.1, 455/343.1
See application file for complete search history.

(56) References Cited

U.S. PATENT DOCUMENTS

| | | | |
|---|---|---|---|
| 5,629,708 A * | 5/1997 | Rodal et al. ............ 342/357.15 |
| 5,883,594 A | 3/1999 | Lau |
| 6,058,338 A * | 5/2000 | Agashe et al. ................. 701/13 |
| 6,064,336 A | 5/2000 | Krasner |
| 6,133,871 A | 10/2000 | Krasner |
| 6,134,483 A | 10/2000 | Vayanos et al. |
| 6,141,570 A | 10/2000 | O'Neill, Jr. et al. |
| 6,211,817 B1 * | 4/2001 | Eschenbach ........... 342/357.03 |
| 6,243,648 B1 | 6/2001 | Kilfeather et al. |
| 6,298,093 B1 | 10/2001 | Genrich |
| 6,323,803 B1 | 11/2001 | Jolley et al. |
| 6,373,429 B1 | 4/2002 | Eschenbach |
| 6,400,314 B1 | 6/2002 | Krasner |
| 6,437,735 B1 * | 8/2002 | McMahan ................. 342/357.1 |
| 6,662,107 B2 | 12/2003 | Gronemeyer |
| 6,937,865 B1 * | 8/2005 | Bloebaum et al. ........ 455/456.1 |
| 2002/0101374 A1 | 8/2002 | Mutoh et al. |
| 2002/0111171 A1 | 8/2002 | Boesch et al. |
| 2002/0168985 A1 | 11/2002 | Zhao et al. |
| 2003/0134646 A1 | 7/2003 | Forrester |
| 2005/0168382 A1 * | 8/2005 | Awata .................... 342/357.02 |

FOREIGN PATENT DOCUMENTS

GB    2 409 376 A    6/2005

OTHER PUBLICATIONS

United Kingdom Search Report for corresponding GB 0510418.7, completed Sep. 26, 2005 by Examiner Richard Kerslake.

* cited by examiner

*Primary Examiner*—Dao Phan
(74) *Attorney, Agent, or Firm*—Tarolli, Sundheim, Covell & Tummino LLP

(57) ABSTRACT

Methods and systems are presented for controlling power cycling in a global positioning system (GPS) assembly. The assembly comprises a power management component that operates to switch a GPS receiver between at least a first mode, in which the receiver is actively receiving almanac and positioning data, and a second mode, in which the receiver does not actively receive data according to a power cycling routine of the receiver. A memory stores a plurality of quanta of almanac data as associated memory blocks, each memory block having an associated status indicating the length of time for which the associated almanac data is expected to be useful. A signal processing component processes a received signal containing at least a portion of a quantum of almanac data and identifies the quantum of almanac data within the received signal. A receiver control adjusts the power cycling routine of the GPS receiver according to the associated status of a memory block associated with the identified quantum of almanac data.

22 Claims, 3 Drawing Sheets

POWER CYCLING FOR A GLOBAL POSITIONING SYSTEM

TECHNICAL FIELD

The present invention relates generally to navigation systems, and more particularly to a power-cycling arrangement for a global positioning system (GPS) receiver for the purpose of extending battery life.

BACKGROUND OF THE INVENTION

The GPS system has achieved enormous popularity with both military and civil users. The system has evolved with its increased acceptance, with advances in GPS receiver technology allowing smaller, more accurate receiver units to be provided. Initially, global positioning systems were confined mainly to vehicles. As the technology has become more widely accepted, however, GPS receivers have been implemented in a number of different environments, each with its unique demands. For example, GPS receivers have been implemented into handheld devices, allowing users to utilize GPS navigation away from their vehicles. These handheld devices have found application in military, recreational, law enforcement and civilian search and rescue applications. Some of these devices also include communications capability for wireless communication with similar units or a central location.

In most applications, it is desirable to maintain consistent periodic estimates of a device's location, both to provide timely aid to the user in navigation and to report a reasonably precise position at a point in time to an oversight/management location. A GPS system must also monitor available almanac and ephemeris data to maintain the ability to obtain a position fix from visible satellites in a reasonable amount of time. This presents little trouble in vehicle implementations, as they generally have access to a large-capacity power supply, but can be problematic in handheld units, which generally have a relatively limited power supply; this problem is compounded when the device includes communications equipment drawing on the same power supply. Current implementations are so inefficient that carrying spare batteries for an entire week of GPS/communications operations would be infeasible for most users.

The fundamental problem with current implementations involves limitations in the present art of how electronic communications are implemented in handheld systems. Weight, size, and battery life are significant design drivers for communications devices designed to carried by an individual (e.g., in the hand, in a backpack, or attached to the body by some other means, such as slung from the belt). This problem is compounded by the fact that the very applications where dismount communications are most useful are those where the weight and size of the communication device are of the most concern. Reducing the power consumption of a GPS receiver without compromising its accuracy or efficiency is therefore desirable.

SUMMARY OF THE INVENTION

The present invention relates to systems and methods for achieving marked improvements in apparent battery life in a global positioning system (GPS) receiver, through automatic cycling of prime power. In accordance with one aspect of the present invention, a global positioning system assembly is provided. The assembly comprises a power management component that operates to switch a GPS receiver between at least a first mode, in which the receiver is actively receiving almanac and positioning data, and a second mode, in which the receiver does not actively receive data according to a power cycling routine of the receiver. A memory stores a plurality of quanta of almanac data as associated memory blocks. Each memory block has an associated status indicating the length of time for which the associated almanac data is expected to be useful. A signal processing component processes a received signal containing at least a portion of a quantum of almanac data and identifies the quantum of almanac data within the received signal. A receiver control adjusts the power cycling routine of the GPS receiver according to the associated status of a memory block associated with the identified quantum of almanac data.

In accordance with another aspect of the invention, a method is provided for conserving power in a handheld global positioning system (GPS) locator device. A GPS receiver is activated to obtain a position fix for an associated device according to a predefined power cycling routine. A portion of a subframe of almanac data for the GPS receiver is received while the GPS receiver is active. At least one block of stored almanac data associated with the received portion of a subframe is identified. The power cycling routine of the GPS receiver is adjusted according to an associated status of the identified block of stored almanac data. The status indicates the length of time for which the block of almanac data is expected to be useful.

In accordance with yet another aspect of the present invention, a handheld communications system comprises a radio frequency (RF) transceiver operative to communicate with other handheld communication systems through a mobile base station. A memory stores a plurality of quanta of almanac data as associated memory blocks. Each memory block has an associated status indicating the length of time for which the associated almanac data is expected to be useful. The mobile base station periodically provides updates to the associated memory blocks via an RF transmission.

In accordance with still another aspect of the invention, a method is provided for conserving power in a handheld communications system that comprises a global positioning system (GPS) receiver. An associated receiver is activated according to a predefined power cycling routine to receive desired data from a mobile base station. At least a portion of a quantum of almanac data is received along with the desired data during communication with the mobile base station. At least one block of stored almanac data associated with the received at least a portion of a quantum is identified. The power cycling routine of the receiver is adjusted according to an associated status of the identified block of stored almanac data. The status indicates the length of time for which the block of almanac data is expected to be useful.

DETAILED DESCRIPTION OF INVENTION

The present invention relates to systems and methods for controlling the power cycling of a global position system (GPS) receiver to maintain current almanac data and location while using minimal power. It will be appreciated that current almanac and position information are desirable for a GPS receiver to maintain a quick time-to-first-fix for position fixes. Accordingly, a GPS receiver apparatus can utilize an associated power cycling routine to take a minimal number of position readings for maintaining the necessary location data. The GPS position can be updated in accordance with an power management associated algorithm, based on time or the motion of the receiver, for example, to keep the position fix accurate to within a margin considered adequate for a given purpose, while at the same time permitting the battery power to the GPS receiver to be off for most of the time. Accordingly, battery power is conserved and the unit can operate for much longer periods of time off of a given-sized battery.

To further conserve power, the system can update almanac incrementally during the periods in which it is active. Almanac data can be stored as a plurality of memory blocks representing quanta of almanac data, with each quantum having an associated status indicative of the useful life of the associated data. The system can incrementally update this data by receiving a certain amount of almanac data each time the GPS receiver is activated to obtain a position fix. By monitoring the status of the memory blocks, the power cycling of the GPS receiver can be altered to activate when updates to stale or invalid data are likely to be received, and to remain active when useful data are being received. Using these techniques, the almanac data and position information for the apparatus can be maintained with the GPS receiver powered on as little as ten to twenty-five percent of the time, with the attendant savings in battery power.

Figure 1:
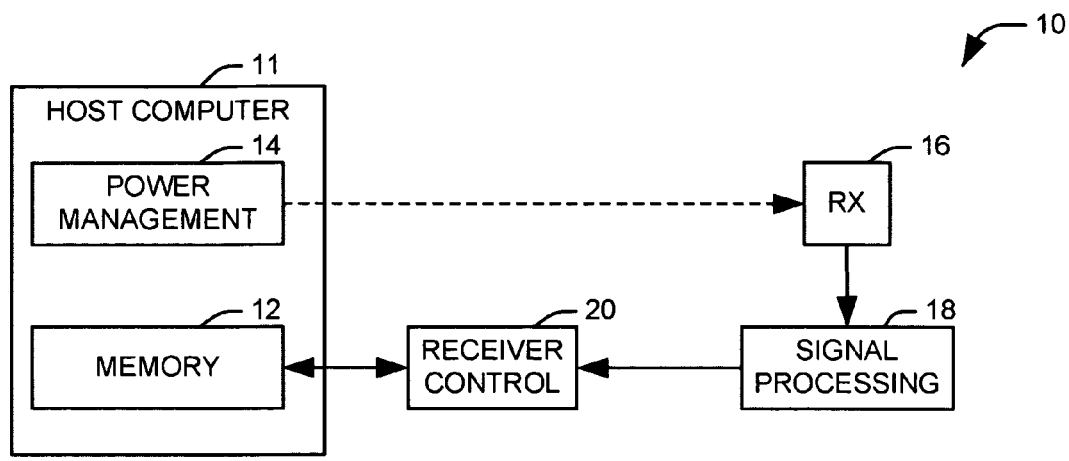
FIG. 1 illustrates a functional block diagram of a GPS receiver apparatus in accordance with an aspect of the present invention.

FIG. 1 illustrates a GPS receiver apparatus 10 in accordance with one aspect of the present invention. In the illustrated implementation, the receiver apparatus 10 includes a host computer 11 comprising a memory 12 and a power management component 14. It will be appreciated, however, that memory and power management functions can instead be implemented within an associated GPS receiver module 16 where desired. The memory 12 stores almanac data describing the movements of at least a portion of the constellation of satellites comprising the GPS navigation network. It will be appreciated that the term almanac is used herein generically to encompass both traditional long-term almanac data that describing the orbits of the satellites, as well as shorter term ephemeris data that provides corrections to the long term almanac data. The almanac data stored in the memory 12 are stored as a plurality of memory blocks, a given memory block comprising a quantum of almanac data that is generally updated as a single unit. Accordingly, the quanta can be divided into logical units, such as the almanac data or ephemeris data for a given satellite in the GPS network. Each memory block can have an associated status reflecting the useful life remaining for the data comprising its associated quantum.

A power management component 14 can direct a receiver 16 to leave a stand-by mode and enter an active mode at periodic intervals, according to a determined power cycling protocol. The protocol can range from a simple, periodic protocol, in which the receiver 16 is activated for a set period of time at known intervals, to a more complex protocol that activates the receiver 16 at irregular intervals based upon the last known position and velocity of the receiver apparatus 10. Each time the receiver 16 enters the active mode, it monitors GPS positioning data and provides the data to a signal processing component 18, which, in turn, calculates an associated location of the GPS receiver apparatus 10. The GPS positioning data can include pseudorandom code data from one or more GPS navigation satellites, as well as almanac data provided by the GPS satellites, or by another source associated with the GPS receiver apparatus 10. The protocol used to control the power cycling can be varied from time to time, in accordance with various parameters by the software application in the host computer.

The quanta of almanac data stored in memory 12 can be formatted to match a corresponding format of the incoming data. For example, when the source of the almanac data is the GPS navigation satellites, a quanta of almanac data represent one or more frames or subframes of the data transmissions, or even one or more individual parameters (e.g., eccentricity) for a given GPS navigation satellite. At any given time, an incoming quantum of almanac data is associated with one of the plurality of memory blocks. While the information is being received, the signal processing component 18 can also evaluate any almanac data received at the receiver 16 to determine its associated memory block. This information is then provided to a receiver control 20

The receiver control 20 determines the utility of the received almanac data according to the status of its associated memory block. For example, the receiver control 20 can determine if the data within the memory block is becoming stale, such that updated information would be desirable. If the received quanta is useful, the receiver control can adjust the power cycling at the power management component 14 to allow the receiver 16 to stay active long enough to finish receiving the desired data. In an exemplary embodiment, the receiver control 20 can take advantage of the known update sequence for GPS almanac data to determine if a next quantum in the sequence would be useful. For example, if the memory block corresponding to the next quantum in the sequence is missing or obsolete, the receiver control 20 may determine that it is worth expending additional power to remain active and receive the incoming data. This allows the receiver apparatus to maintain a current set of almanac data without the unnecessary expenditure of battery power.

Figure 2:
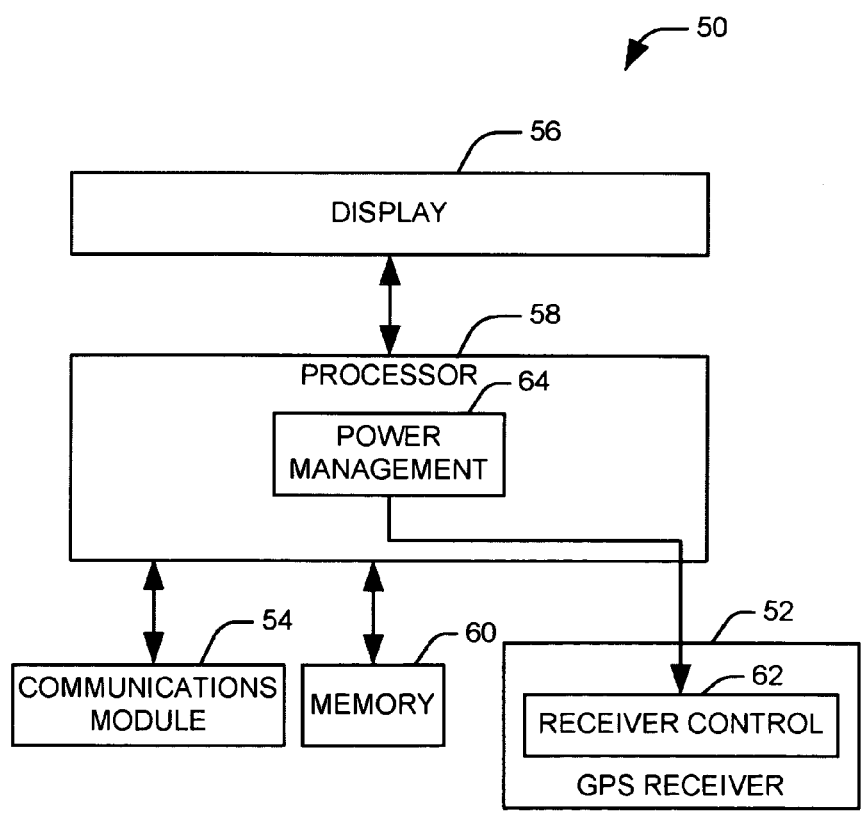
FIG. 2 illustrates a functional block diagram of a handheld communications device including a GPS receiver assembly in accordance with an aspect of the present invention.

FIG. 2 illustrates a handheld communications device 50 including a GPS receiver assembly in accordance with an aspect of the present invention. The illustrated device 50 utilizes an adaptive power cycling arrangement in accordance with the present invention to maintain accurate GPS almanac data for a GPS receiver 52 at a minimal cost in battery life. In the illustrated example, the handheld locator device 50 also includes a communications module 54 that provides communications capabilities in addition to the GPS navigation function of the device. For example, the communications module 54 can comprise a radio frequency (RF) transceiver that communicates with other handheld units either directly, through a system of cellular stations, or through a terrestrial, airborne, or orbital relay.

The device includes a display 56 that illustrates stored maps and waypoints within the locator device 50. The display 56 can also display data provided by the communication module 54. The display 56 can include touchscreen capabilities to double as an input device for the user. Alternatively, one or more input ports (not shown) can be provided for incorporating peripheral input devices, such as a miniature keyboard, a mouse, a microphone, or any of a number of other suitable devices for inputting commands. The device 50 can also include a processor 58 that processes user input, GPS information, and messages or data received at the communications module 54.

The processor 58 is operatively connected to a memory 60. The memory 60 can comprise any of a number of data storage mediums known in the art. In an exemplary implementation, the memory 60 comprises a block of flash read-only memory (ROM) and a block of working memory. In an exemplary implementation, the working memory comprises one or more chips of synchronous dynamic random access memory (SDRAM). Basic software, such as an operating system and any necessary drivers, are encoded in the ROM memory. The memory 60 can contain operational software and other data of interest to the system, as well as the necessary satellite almanac and ephemeris data for quickly locating and tracking a set of GPS navigation satellites.

The almanac and ephemeris data in the memory 60 can be stored as a plurality of data blocks, with each block corresponding to an appropriate quantum of data. In the illustrated example, the almanac data is retrieved according to the standard positioning service (SPS), with each block of stored data corresponding to one relevant page of almanac data or ephemeris data for a given satellite, a page being defined as the contents of a subframe for a thirty second frame within the signal. Each block has an associated status field that indicates the remaining useful life of the data. This can be indicated according to the time of applicability attached to the almanac data, the present time determined from the GPS receiver 60, and the expected useful life of the data.

For example, the status indicator can comprise a two-bit indicator, with a first value indicating "current" data that has more than half of its useful life remaining, a second value indicating "stale" data having less than half of its useful life remaining, a third value indicating "obsolete" data that has exceeded its useful life, and a fourth value indicating "invalid" data that is corrupted or missing. It will be appreciated that the various status levels can be defined differently, depending on the intended purpose of the GPS receiver. Memory blocks corresponding to different subframes can have different spans of useful life. For example, in the SPS, subframes two and three generally carry ephemeris data for the transmitting satellite. These frames are repeated every frame and have a useful life of approximately four hours. Subframes four and five generally carry long-term almanac data for all of the satellites. A given page of one of these subframes corresponds to data for one satellite, with each page repeated every twenty-five frames (12.5 seconds). This data has a significantly larger useful life, general on the order of days.

The GPS receiver 52 locates a selected set of GPS navigation satellites and monitors various codes broadcast from satellites to determine a position for the device 50. The selected set of monitored satellites can be determined by a GPS receiver control 62 according to the visibility of the satellites and a preferred geometric arrangement of the satellites (e.g., to minimize dilution of precision effects). It will be appreciated that the GPS receiver control 62 can be implemented as a software module executed by a processor associated with the GPS receiver or as a dedicated hardware component. The GPS receiver 52 makes use of the almanac data stored in the memory 60 to determine the location of each satellite the selected satellite set and obtain the code broadcast from each satellite. Errors within this almanac data increase the time necessary to locate the navigation satellites, consuming additional power in obtaining the code data used for determining the location of the device.

The activity of the GPS receiver 52 is regulated by a power management component 64. It will be appreciated that the power management component 64 can be implemented as a software module executed by the processor 58 or as a dedicated hardware component. The power management component 64 can activate the GPS receiver from a stand-by mode according to a determined power cycling routine to allow it to obtain the code signals from the GPS satellites. From the code signals, the processor 58 can determine a position for the device 50. When the appropriate codes have been received and the position of the device 50 has been determined, the power management component 64 signals the GPS receiver to return to stand-by. In an exemplary implementation, the power cycling routine can obtain a position reading just often enough to obtain reliable initial position data for future readings. This can be determined according to the passage of a predetermined period of time, or upon a variable time period based on an estimated velocity. The purpose of the power-management protocol is to bound the maximum positional uncertainty to a figure determined by the dynamic behavior of the person carrying the unit, in combination with the positional accuracy required by the mission or function that the person is performing. The power-cycling behavior would vary based on the positional-accuracy required, which specification of accuracy might vary over time.

An example protocol would be the use of the GPS receiver to derive an average velocity of the user over a recent time interval, and combining that velocity and the positional accuracy goal, the accuracy estimated for the next GPS position reading, and the estimated time-to-first-fix upon leaving a power-off/sleep cycle to determine the duration of the next power-off/sleep interval. This process can be repeated during each power-on cycle, so that the duration of each power-off/sleep interval is calculated dynamically immediately prior to the commencement of that interval; no two GPS power-off/sleep intervals would need to be of the same duration. Another example of such a protocol would be calculate the power-off/sleep interval on a less-frequent basis, but introduce the additional concept of synchronizing the power-off/sleep intervals of sets of devices, carried by associated personnel; this would allow the communications devices to save battery power through the use of power-off/sleep cycles, in addition to the power saved through having the GPS receiver save power through this mechanism. The power-management protocol takes advantage of the fact that the use of the almanac data allows the time-to-first-fix after turning the power to the GPS receiver back on to be very short; after power-on, we take one or two GPS position and time readings, and can then immediately cycle the power back off for some duration (where the duration of the power-off/sleep interval is determined by the protocol, using a method such as those described above). The use of such a protocol allows us to have the unit off (and hence, not expending battery power) for much of the time, while still satisfying the need for positional accuracy to the level required by this particular mission. The power savings is enabled by the fact that using power to maintain almanac data in memory uses much less power than operating the GPS receiver, and we do not normally need continuous GPS readings to achieve the positional accuracy required for most missions and functions performed by hand-carried electronics units.

While the GPS receiver 52 is receiving the code signals, it can also receive almanac and ephemeris data provided by each navigation satellite as a separate channel. The received data is evaluated by the GPS receiver control 62 to determine if any full pages of data have been received, and if so, which blocks of memory they correspond to in the received data via an ID field associated with each page. These blocks can be immediately updated from the complete blocks, regardless of their associated status. The GPS receiver control 62 can also determine the blocks of memory that correspond to any partial pages received, and determine the status of the corresponding blocks. If the corresponding blocks are in need of an update (e.g., stale, obsolete, or invalid), the GPS receiver control can alter the power cycling routine at the power management component to maintain the receiver in an active state until any needed pages have been fully received.

In an exemplary embodiment, the GPS receiver control 62 can also determine if any blocks in memory are completely obsolete or invalid. If so, the GPS receiver control 62 can determine a time interval in which the necessary pages will be broadcast from the identified page and the known sequence of the frames in the SPS signal. The power cycling routine at the power management component 64 can be adjusted to activate the GPS receiver at the appropriate time to receive the necessary data. This allows the GPS receiver to replace corrupt or obsolete data without expending the power to receiver an entire twenty-five frame sequence of SPS signals.

Figure 3:
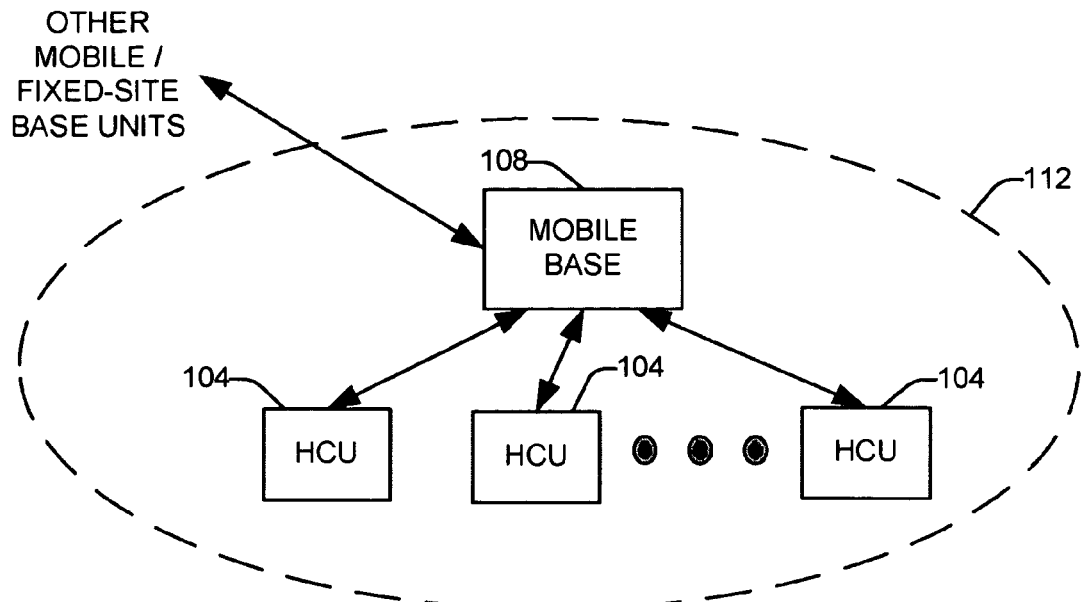
FIG. 3 illustrates a mobile communication system in accordance with an aspect of the present invention.

FIG. 3 illustrates a mobile communication system 100 in accordance with one or more aspects of the present invention. The mobile communication system 100 includes a plurality of handheld communication units (HCUs) 104, incorporating a communication means, such as two-way radios, a computer processor, and a GPS receiver in accordance with the present invention. The HCUs 104 are operative to communicate with one another wirelessly, and are adapted to transmit and/or receive voice, image, and/or data information (e.g., administrative data, location data, configuration data, and priority data). The communication system 100 facilitates transmissions between HCUs at very low power requirements, thus extending the useful life of batteries in the units while also reducing the size and weight of batteries required.

The mobile communication system 100 further includes a mobile base station 108 defining a coverage area or cell range 112 of the system 100. The mobile base station 108 is operative to receive transmissions from the HCUs 104 and to re-broadcast the transmissions at the same or boosted power levels to other HCUs within the coverage area 112. In accordance with one or more aspects of the present invention, the mobile base 108 can move along with the HCUs such that the entire coverage area 112 is mobile. The mobile base 108 may, for example, be part of a ground vehicle moving with a group of HCUs 104. Since the base 108 is mobile, the coverage area 112 defined by the base can move and, as such, the HCUs 104 can move around without leaving the coverage area 112 thereby maintaining the ability to communicate with other units within the system 100. Additionally, since the mobile base 108 can transmit signals at an increased power level, the communications can be transmitted to other communication devices (e.g., a home base) outside the coverage area 112 directly, or through other mobile and/or fixed-site base units.

In accordance with the present invention, the base station 108 includes a GPS receiver that receives almanac and ephemeris data from one or more GPS network satellites that are visible within the coverage area 112. This data can be received constantly or on a regular basis, as the mobile base station 108 will generally have significantly greater power capacity than the HCUs. Accordingly, the mobile base station 108 can maintain a complete and current store of almanac data without substantially draining its available power. The mobile base station 108 can also provide communications capacity to between MCUs within the coverage area and entities outside of the coverage area 112. For example, the mobile base station 108 can be operative to communicate with one or more communication satellites (not shown) to convey data between a given MCU and an external entity, such as central communications hub or other mobile base station.

In one example, a central command unit, located outside of the coverage area broadcasts information (e.g., data, voice) to the mobile base unit. For example, in a military application, each coverage area can be provided with situational update information at regular intervals, reflecting the position of one or more other affiliated mobile communication units, vehicles, and other units. To facilitate this, the mobile communications units can periodically report their determined positions to the mobile base station. In accordance with an aspect of the present invention, the mobile base station 108 receives the external information and retransmits it as an analog signal (e.g., as radio frequency electromagnetic waves) that is received by one or more MCUs. Along with the received information, the mobile base station 108 can provide a block of almanac or ephemeris data to the one or more MCUs.

In an exemplary embodiment, communications from the mobile base station 108 are provided on a periodic basis. Accordingly, the MCUs 104 can remain in a stand-by mode until a communication from the mobile base station 108 is expected according to a predefined power cycling routine. Once the communication from the mobile base station has been received, the MCU can evaluate the almanac or ephemeris data included with the transmission to determine if it is desirable for the MCU, by checking the present state of the corresponding block within its stored GPS almanac data, for example. If the provided block corresponds to a block of almanac data that is growing stale, the MCU can continue receiving the data and update its almanac. If the provided data block is not useful, the MCU can ignore the provided data and return to stand-by mode. This allows the MCUs 104 to obtain almanac data over a less power intensive means (e.g., terrestrial radio) while still utilizing selective power cycling to eliminate unnecessary power use. The current almanac data also allows the MCUs to quickly obtain a first fix after a period of latency, allowing the GPS receivers associated with the MCUs to be placed in stand-by until it is necessary to obtain a periodic location fix.

Figure 5:
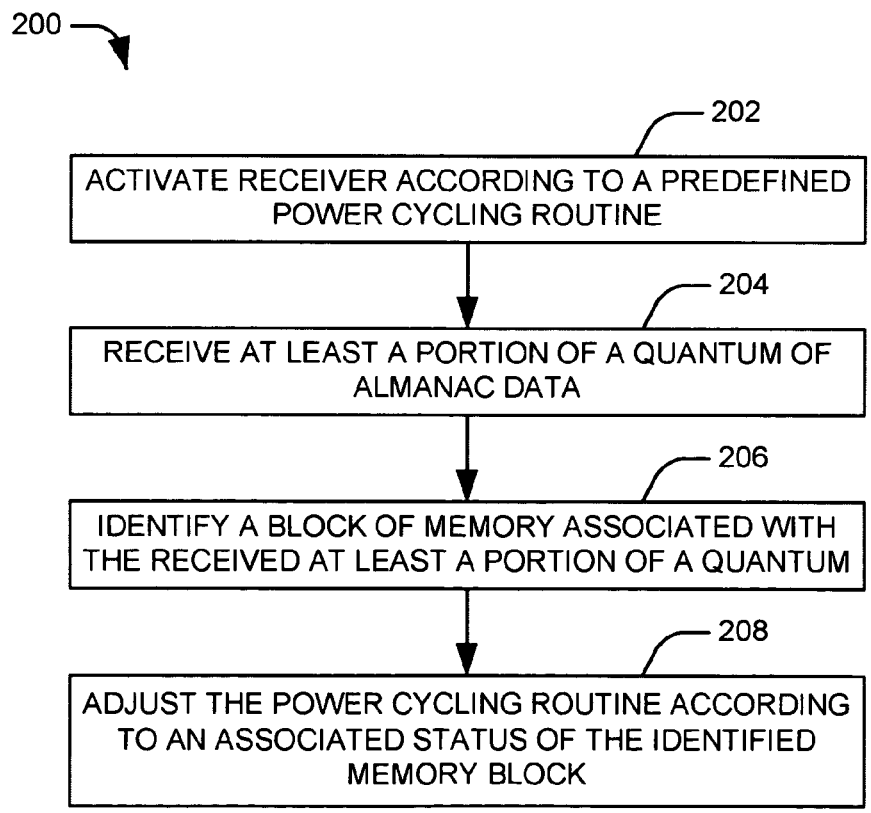
FIG. 5 illustrates a methodology for regulating power cycling in a handheld GPS locator system.
Figure 4:
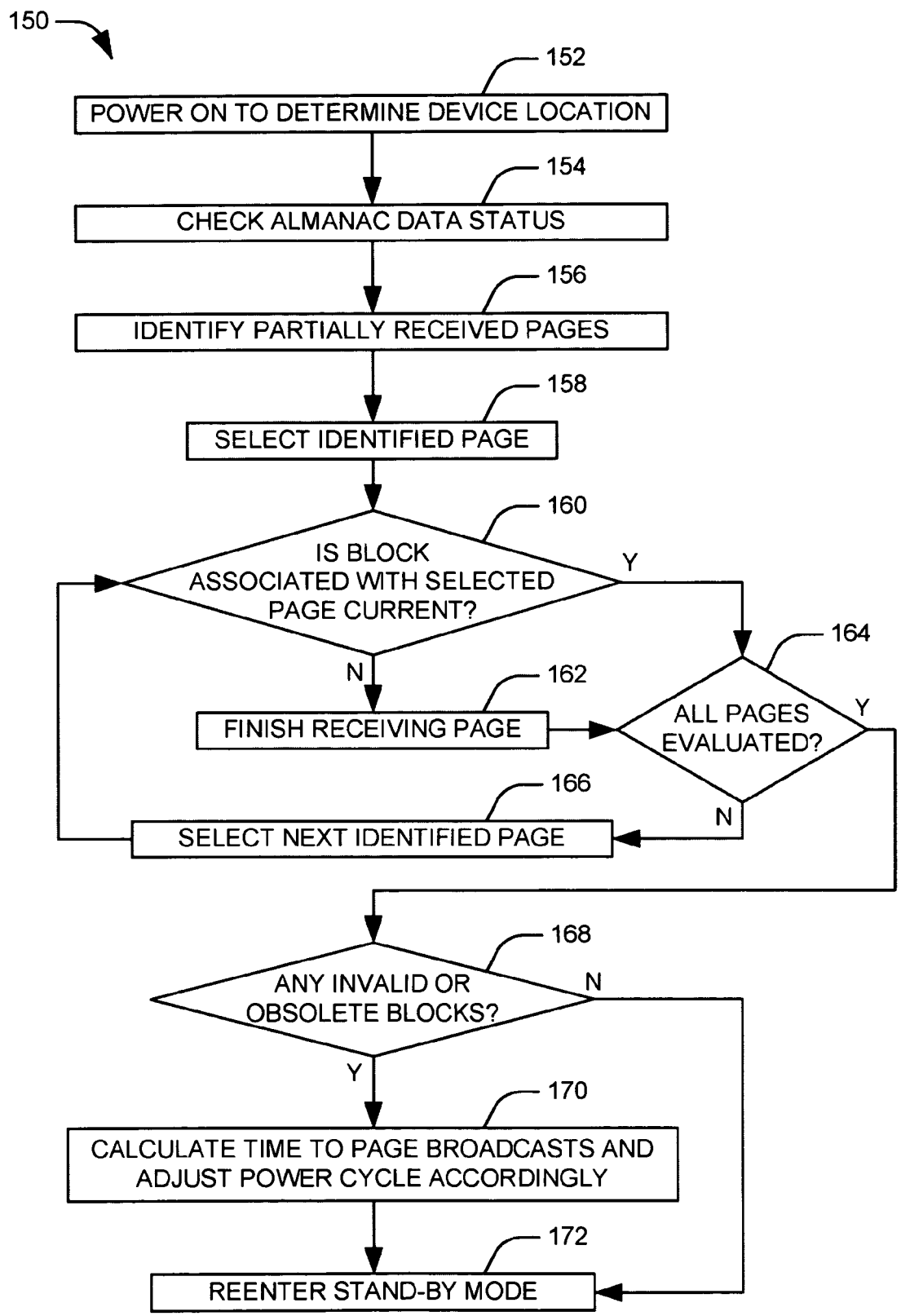
FIG. 4 illustrates an exemplary GPS power cycling methodology in accordance with an aspect of the present invention.

In view of the foregoing structural and functional features described above, methodologies in accordance with various aspects of the present invention will be better appreciated with reference to FIGS. 4-5. While, for purposes of simplicity of explanation, the methodology of FIGS. 4-5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 4 illustrates an exemplary GPS power cycling methodology 150 in accordance with an aspect of the present invention. The illustrated methodology 150 allows a GPS receiver device to maintain accurate almanac data without expending a large amount of power to stay active for long intervals. The methodology begins at 152, where the GPS receiver is brought to an active mode according to power cycling routine associated with the device. For example, the power cycling routine can activate the GPS receiver according to an associated algorithm based on the passage of time and an estimated velocity of the GPS receiver device to obtain position information for the receiver device. The methodology then advances to 154, where the receiver receives one or more pages of almanac data from the GPS navigation satellites. Some of the pages will be fully received during the determination of the device position and can be used to update applicable portions of the device memory. Some will not have been received in part, but will not have been completely received at the time of the location determination. It will be appreciated that the almanac data will be received from multiple satellites, and that multiple partial pages can be received by the GPS receiver.

The methodology then advances to 156, where the partially received data blocks are identified with respect to a corresponding block in the device memory. This can be accomplished, for example, by evaluating a satellite ID field or similar identifier associated with each page. One of the identified pages is then selected at 158 for evaluation. At 160, it is determined if the memory block associated with the selected page is current. For example, a status indicator associated with the memory block can be checked to ensure that the data meets predefined standards with respect to its remaining useful life. For example, a time of applicability associated with the memory block can be compared with the present time determined by the GPS receiver to determine a remaining useful life of the data.

If the memory block is determined not to be current (N), the method advances to 162, where power cycling routine of the receiver is adjusted to allow the receiver to receive the entire page. The methodology then proceeds to 164. If the memory block is determined to be current (Y), the methodology proceeds directly to 164. For the purposes of the present methodology, current data is data that has over half of a predetermined period of useful life remaining. At 164, it is determined if all of the partial pages have been evaluated. If not (N), the methodology continues to 166, where the next identified partial page is selected. The methodology then returns to 160 to evaluate the status of the selected memory block. If all of the identified partial pages have been evaluated (Y), the methodology advances to 168, where it is determined if there are any obsolete or invalid frames in memory. For the purposes of this methodology, invalid data is corrupted or missing data, and obsolete data is data that has exceeded its expected useful life.

If any of the memory blocks is obsolete or invalid (Y), the methodology advances to 170, where the power cycling is adjusted to update the invalid or obsolete memory blocks. In the SPS protocol, almanac information for the various satellites is provided as a series of twenty-five thirty second frames, repeating every twelve and one-half minutes. Since the sequence and timing of the frames is known, an approximate time at which the necessary data will be broadcast can be determined from the identity of the currently received frame. Accordingly, the power cycling can be adjusted to activate around this time to obtain the desired data. For example, if the GPS power cycling requires a location fix every five minutes, and the desired data is scheduled to be broadcast in four minutes, the GPS power cycle can be adjusted forward by one minute to obtain the needed data. It will be appreciated that regular fixes are necessary to maintain a low time-to-first-fix for the system, and that the adjustment of the power cycle will be governed by an associated power management component to ensure that position fixes are obtained with sufficient regularity. The methodology then continues to 172, where the GPS receiver enters stand-by mode and the methodology terminates. If none of the memory blocks are invalid or obsolete (N), the methodology proceeds directly to 172 and terminates.

FIG. 5 illustrates a methodology 200 for regulating power cycling in a handheld GPS locator system. At 202, a receiver associated with the device is activated according to a predefined power cycling routine. This can include a standard GPS receiver or an RF receiver for receiving almanac data from a mobile base station. At 204, at least a portion of a quantum of almanac data is received. For example, a quantum of almanac data can represent one subframe, or page, of almanac data. At 206, at least one block of stored almanac data associated with the received at least a portion of a quantum is identified. Finally, at 208, the power cycling routine of the receiver is adjusted according to an associated status of the identified block of stored almanac data, the status indicating the length of time for which the block of almanac data is expected to be useful.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A global positioning system (GPS) assembly, comprising:
    a power management component that operates to switch a GPS receiver between at least a first mode, in which the receiver is actively receiving almanac and positioning data, and a second mode, in which the receiver does not actively recieve data according to a power cycling routine of the receiver;
    a memory that stores a plurality of quanta of almanac data as associated memory blocks, each memory block having an associated status indicating the length of time for which the associated almanac data is expected to be useful;
    a signal processing component that processes a received signal containing at least a portion of a quantum of almanac data and identifies the quantum of almanac data within the received signal; and
    a receiver control that adjusts the power cycling routine of the GPS receiver according to the associated status of a memory block associated with the identified quantum of almanac data.

2. The system of claim 1, the power cycling routine directing the power management component to switch to the first mode at regular intervals as to maintain a desired precision in position information for the GPS assembly, such that a desiredtime-to-quick-fix can be achieved when the GPS receiver is switched to the first mode.

3. A handheld communications device comprising the GPS assembly of claim 1.

4. The communications device of claim 3, further comprising a communications module operative to communicate with at least one other handheld communications device through a mobile base station.

5. The communications device of claim 4, in which the mobile base station includes a GPS receiver that obtains at least one quantum of almanac data and a communications module that broadcasts the at least one quantum of almanac data to a plurality of handheld communications devices.

6. The assembly of claim 1, wherein the receiver control adjusts the power cycling routine to stay in the first mode until the entirety of the identified quantum of almanac data has been received.

7. The assembly of claim 1, wherein the receiver control adjusts the power cycling to switch the GPS receiver from the second mode to the first mode at a time when a desired quantum of almanac data is expected to be received, based upon the identified quantum of almanac data.

8. A method of conserving power in a handheld global positioning system (GPS) locator device comprising:
   activating a GPS receiver to obtain a position fix for an associated device according to a predefined power cycling routine;
   receiving a portion of a subframe of almanac data for the GPS receiver while the GPS receiver is active;
   identifying at least one block of stored almanac data associated with the recieved portion of a subframe; and
   adjusting the power cycling routine of the GPS receiver according to an associated status of the identified block of stored almanac data, the status indicating the length of time for which the block of almanac data is expected to be useful.

9. The method of claim 8, the predefined power cycling routine being operative to maintain current position information for the GPS locator device as to allow for a desired time-to-quick-fix when the GPS receiver is activated.

10. The method of claim 8, wherein adjusting the power cycling routine includes allowing the GPS receiver to remain active until the remainder of the portion of a subframe has been received.

11. The method of claim 8, further comprising:
   determining a memory block having an associated status indicating that its associated stored almanac data is invalid; and
   calculating an expected time at which a subframe associated with the memory block will be received, according to the received portion of a subframe and a known sequence of subframes.

12. The method of claim 11, wherein adjusting the power cycling routine includes adjusting the power cycle to activate the GPS receiver at the calculated time.

13. The method of claim 8, further comprising receiving updated almanac data from an associated mobile base station.

14. A handheld communications system, comprising:
   a radio frequency (RF) transceiver operative to communicate with other handheld communication systems through a mobile base station;
   a memory that stores a plurality of quanta of almanac data as associated memory blocks, each memory block having an associated status indicating the length of time for which the associated almanac data is expected to be useful, the mobile base station periodically providing updates to the associated memory blocks via an RF transmission; and
   a power management component that operates to switch the transceiver between at least a first mode, in which the transceiver is actively receiving data, and a second mode, in which the transceiver does not actively receive data according to a power cycling routine of the transceiver.

15. The system of claim 14, further comprising:
   a signal processing component that processes a received signal containing at least a portion of a quantum of almanac data and identifies the quantum of almanac data within the received signal; and
   a transceiver control that adjusts the power cycling routine of the transceiver according to the associated status of a memory block associated with the identified quantum of almanac data.

16. The system of claim 14, wherein the mobile base station is operative to relay communications between a plurality of associated handheld communications systems within an associated coverage area.

17. The system of claim 14, wherein the mobile base station is operative to relay communications between the handheld communication system and at least one entity outside of an associated coverage area.

18. The system of claim 17, wherein the mobile base station provides the updated almanac information to the handheld communications system along with relayed communications.

19. A method of conserving power in a handheld communications system that comprises a global positioning system (GPS) receiver, comprising:
   activating an associated receiver according to a predefined power cycling routine to receive desired data from a mobile base station;
   receiving at least a portion of a quantum of almanac data along with the desired data during communication with the mobile base station;
   identifying at least one block of stored almanac data associated with the received at least a portion of a quantum; and
   adjusting the power cycling routine of the receiver according to an associated status of the identified block of stored almanac data, the status indicating the length of time for which the block of almanac data is expected to be useful.

20. The method of claim 19, wherein adjusting the power cycling routine includes allowing the GPS receiver to remain active after the desired data has been received until the entirety of the at least a portion of a subframe has been received.

21. The method of claim 19, the desired data including situational update information related to at least one other handheld communication system.

22. The method of claim 19, the method further comprising determining a location associated with the handheld communication device and reporting that location to the base station.

* * * * *